Oct. 14, 1958    J. E. JONES    2,856,285
SUPERSENSITIZATION OF PHOTOGRAPHIC SILVER HALIDE EMULSIONS

Filed Feb. 18, 1957

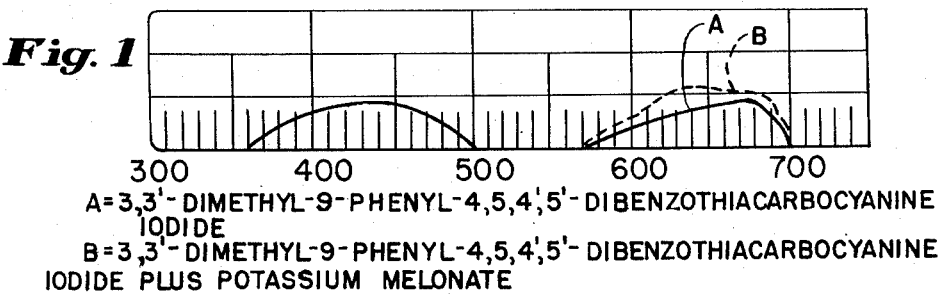

Fig. 1

A = 3,3'-DIMETHYL-9-PHENYL-4,5,4',5'-DIBENZOTHIACARBOCYANINE IODIDE
B = 3,3'-DIMETHYL-9-PHENYL-4,5,4',5'-DIBENZOTHIACARBOCYANINE IODIDE PLUS POTASSIUM MELONATE

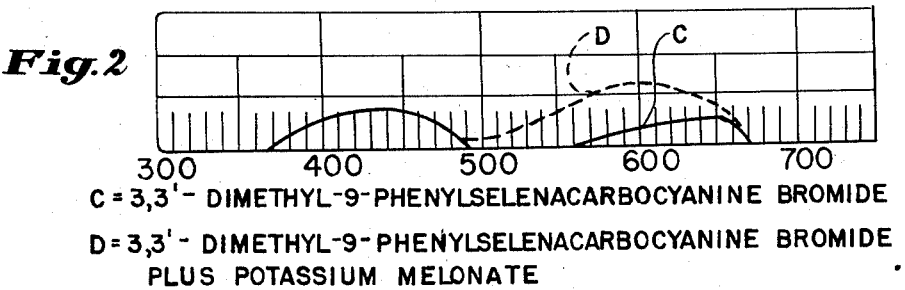

Fig. 2

C = 3,3'-DIMETHYL-9-PHENYLSELENACARBOCYANINE BROMIDE
D = 3,3'-DIMETHYL-9-PHENYLSELENACARBOCYANINE BROMIDE PLUS POTASSIUM MELONATE

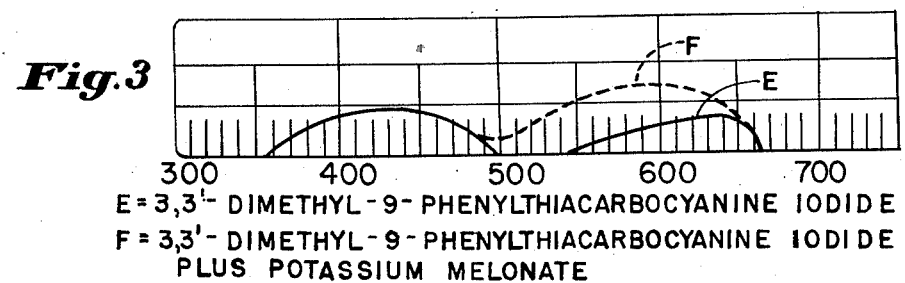

Fig. 3

E = 3,3'-DIMETHYL-9-PHENYLTHIACARBOCYANINE IODIDE
F = 3,3'-DIMETHYL-9-PHENYLTHIACARBOCYANINE IODIDE PLUS POTASSIUM MELONATE

Jean E. Jones
INVENTOR.

BY
ATTORNEYS

United States Patent Office 2,856,285
Patented Oct. 14, 1958

2,856,285

SUPERSENSITIZATION OF PHOTOGRAPHIC SILVER HALIDE EMULSIONS

Jean E. Jones, Rochester, N. Y., assignor to Eastman Kodak Company, Rochester, N. Y., a corporation of New Jersey Application February 18, 1957, Serial No. 640,683

19 Claims. (Cl. 96—104)

This invention relates to photographic silver halide emulsions containing certain carbocyanine dyes and in supersensitizing combination therewith, an alkali metal salt of melonic acid.

This application is a continuation-in-part of my application Serial No. 567,146, filed February 23, 1956, now U. S. Patent 2,801,172, issued July 30, 1957.

It is known in the art of making photographic emulsions that certain dyes of the cyanine class alter the sensitivity of photographic emulsions of the gelatino-silver-halide kind, when the dyes are incorporated in the emulsions. It is also known that the sensitization produced by a given dye varies somewhat with the type of emulsion in which the dye is incorporated. Furthermore, the sensitization of a given emulsion by a given dye may be altered by varying the conditions in the emulsion. For example, the sensitization may be increased by increasing the silver ion concentration or decreasing the hydrogen ion concentration (i. e., increasing the alkalinity) or both. Thus, sensitization can be increased by bathing plates, coated with a spectrally sensitized emulsion, in water or in aqueous solutions of ammonia. Such a process of altering the sensitivity of a sensitized emulsion by increasing the silver ion concentration and/or by decreasing the hydrogen ion concentration is commonly called "hypersensitization." Hypersensitized emulsions have generally poor keeping qualities.

I have now found another means of altering the sensitivity in emulsions containing carbocyanine dyes. Since the conditions in the emulsion, i. e., the hydrogen ion and/or the silver ion concentration undergo little or no change in my method, I shall designate my method as a kind of supersensitization.

It is, therefore, an object of my invention to provide photographic silver halide emulsions containing certain carbocyanine dyes and as supersensitizers therefor, alkali metal salts of melonic acid. Another object is to provide a means for preparing these supersensitized emulsions. Other objects will become apparent from a consideration of the following description and examples.

In my copending application Serial No. 567,146, I have shown that dicarbocyanine dyes can be employed in supersensitizing combinations with various derivatives of melon and cyameluric acid. However, I have found that cyameluric acid and its alkali metal salts cannot be usefully employed in the combinations hereinafter described. Moreover, the alkali metal melonates useful in my invention cannot generally be employed in supersensitizing combinations including unsubstituted carbocyanine dyes or carbocyanine dyes containing such chain-substituents as alkyl, etc. That is, it has been found that no significant (or measurable) supersensitizing effect is observed with many unsubstituted carbocyanine dyes and meso-alkylcarbocyanine dyes. It was not expected, therefore, that the useful results illustrated below could be obtained with the particular carbocyanine dyes of my invention.

The alkali metal melonates useful in my invention have been previously described in "Jour. Am. Chem. Soc.," vol. 61, page 3420 and vol. 62, page 842. Such alkali metal salts can be regarded as derived from hydromelonic acid, which is believed to have the formula represented below, although it is to be understood that I intend this formula to embrace all isomeric or tautomeric forms which the literature identifies as hydromelonic acid. That is, while there may be some uncertainty as to the configuration shown in the formula, there is no uncertainty as to the identity of this product.

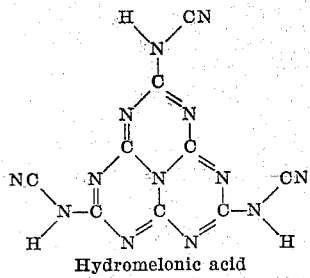

Hydromelonic acid

The particular carbocyanine dyes which are useful in practicing my invention include those dyes represented by the following general formula:

I. 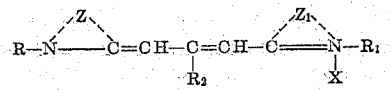

wherein R and $R_1$ each represents an alkyl group (such as methyl, ethyl, β-hydroxyethyl, carboxymethyl, β-carboxyethyl, carbomethoxy-methyl, carbethoxymethyl, etc., especially an alkyl group containing from 1 to 4 carbon atoms), $R_2$ represents an aryl group, such as phenyl, o-, m-, and p-tolyl, o-, m-, and p-chlorophenyl (e. g., a mononuclear aromatic group of the benzene series), α-naphthyl, β-naphthyl, etc.; a pyrryl group (simple or condensed nucleus, such as pyrryl, indolyl, pyrrocolyl, benzoindolyl, etc.); a thienyl group, such as 2-thienyl, 3-thienyl, 2,5-dichloro-3-thienyl, etc.; or an amino group, such as amino or substituted amino (e. g., methylamino, ethylamino, piperidino, morpholino, anilino, etc.), X represents an acid radical, such as chloride, iodide, bromide, perchlorate, benzenesulfonate, p-toluenesulfonate, ethylsulfate, methylsulfate, etc., and Z and $Z_1$ each represents the non-metallic atoms necessary to complete a heterocyclic nucleus containing from 5 to 6 atoms in the heterocyclic ring, e. g., a heterocyclic nucleus of the benzothiazole series (e. g., benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 6-iodobenzothiazole, 5-iodobenzothiazole, 4-ethoxybenzothiazole, 5-ethoxybenzothiazole, 5,6-dimethylbenzothiazole, 5-hydroxybenzothiazole, 6-hydroxybenzothiazole, etc.), a heterocyclic nucleus of the naphthothiazole series (e. g., α-naphthothiazole, β-naphthothiazole, 7-methoxy-α-naphthothiazole, 8-methoxy-α-naphthothiazole, 5-methoxy-β-naphthothiazole, 5-ethoxy-α-naphthothiazole, etc.), a hetercocyclic nucleus of the benzoselenazole series (e. g., benzoselenazole, 5-chlorobenzoselenazole, 6-methoxybenzoselenazole, 5-methoxybenzoselenazole, etc.), a heterocyclic nucleus of the naphthoselenazole series (e. g., α-naphthoselenazole, β-naphthoselenazole, etc.), a heterocyclic nucleus of the benzoxazole series (e. g., benzoxazole, 5-hydroxybenzoxazole, 6-hydroxybenzoxazole, 5-chlorobenzoxazole, 5-methoxybenzoxazole, 6-methoxybenzoxazole, 5-phenylbenzoxazole, 5-bromobenzoxazole, etc.), a heterocyclic nucleus of the naphthoxazole series (e. g., α-naphthoxazole, β-naphthoxazole, etc.), a heterocyclic nucleus of the 2-quinoline series (e. g., 2-quinoline, 6-methyl-2-quinoline , 7-methyl-2-quinoline, 8-methyl-2-quinoline, 6-chloro-2-quinoline, 8-chloro-2-quinoline, 4-chloro-2-quinoline, 5-ethoxy-2-quinoline, 6-ethoxy-2-quinoline, 7-ethoxy-2-quinoline, 6-hydroxy--2-quinoline, 7-hydroxy-2-quinoline, 6-methoxy-2-quinoline, etc..), etc.

Many of the dyes represented by Formula I above wherein $R_2$ represents an aryl group have been previously described in the literature. See, for example, U. S. Patents 1,934,659, issued November 7, 1933; 2,107,379, issued February 8, 1938; 2,112,140, issued March 22, 1938; 2,369,646, issued February 20, 1945; 2,369,657, issued February 20, 1945; 2,486,173, issued October 25, 1949; and 2,515,913, issued July 18, 1950.

The carbocyanine dyes represented by Formula I above wherein $R_2$ represents an amino group include those dyes represented by the following general formula:

II.

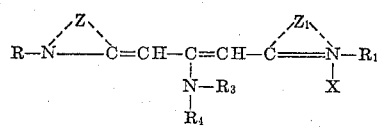

wherein R, $R_1$, X, Z and $Z_1$ each have the values given above, $R_3$ represents a hydrogen atom, an alkyl group (such as methyl, ethyl, n-propyl, isopropyl, n-amyl, n-heptyl, n-octyl, etc.), an aryl group (e. g., phenyl, o-, m-, and p-tolyl, p-dimethylaminophenyl, α-naphthyl, β-naphthyl, o-, m-, and p-chlorophenyl, o-, m-, and p-methoxyphenyl, etc., especially a mononuclear aromatic group of the benzene series), or a carboxylic acyl group (e. g., acetyl, propionyl, n-butyryl, benzoyl, o-, m-, and p-methoxybenzoyl, etc., especially a carboxylic acyl group containing from 2 to 8 carbon atoms), $R_4$ represents an alkyl group (e. g., methyl, ethyl, etc., especially a lower alkyl group) or an aryl group, including those aryl groups listed above with respect to $R_3$, or $R_3$ and $R_4$ together represent the non-metallic atoms necessary to complete a heterocyclic nucleus, such as piperidine, morpholine, etc. The dyes represented by Formula II above can be prepared according to methods previously described in the prior art, such as British Patent 719,238, published December 1, 1954, British Patent 726,148, published March 16, 1955, etc. For example, these dyes can be prepared by reacting a meso-alkylthiocarbocyanine dye with a primary or secondary amine, such as diphenylamine.

The carbocyanine dyes represented by Formula I above where $R_2$ represents a pyrryl group include those dyes represented by the following general formula:

III.

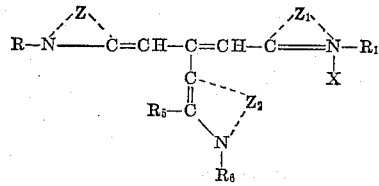

wherein R, $R_1$, X, Z and $Z_1$ each has the values given above, $R_5$ and $R_6$ each represents a hydrogen atom, an alkyl group (e. g., methyl, ethyl, n-propyl, n-amyl, n-heptyl, n-dodecyl, cyclohexyl, etc.), or an aryl group (e. g., phenyl, o-, m-, and p-tolyl, etc., especially a mononuclear aromatic group of benzene series) or $R_5$ and $R_6$ together can represent the non-metallic atoms necessary to complete a heterocyclic nucleus of the pyridine series, and $Z_2$ represents the non-metallic atoms necessary to complete a pyrrole group (including simple or condensed pyrrole nuclei, e. g., pyrrole, indole, pyrrocoline, benzoindole). The dyes represented by Formula III above have been previously described in the prior art. See U. S. Patent 2,666,761, issued January 19, 1954.

By alkali metal salts, I mean sodium, potassium, etc.

Typical of the substituted carbocyanine dyes which can be employed in practicing my invention are the following:

1. 3,3'-dimethyl-9-phenyl - 4,5,4',5' - dibenzothiacarbocyanine iodide
2. 3,3'-dimethyl-9-phenylthiacarbocyanine iodide
3. 3,3'-diethyl-9-(2-methyl-3-indolyl) - 4,5,4',5' - dibenzoxathiacarbocyanine iodide
4. 3,3'-dimethyl-9-(2-methyl - 3 - indolyl)oxathiacarbocyanine iodide
5. 1,1'-dimethyl-10-phenyl-2,2'-carbocyanine bromide
6. 3,3'-dimethyl-9-(2-thienyl) - 4,5,4',5' - dibenzoxathiacarbocyanine iodide
7. 3,3'-dimethyl-9-(2-thienyl) 4,5,4',5'-dibenzothiacarbocyanine p-toluenesulfonate
8. 3,3'-dimethyl-9-(2-pyrryl) - 4,5,4',5' - dibenzoselenathiacarbocyanine p-toluenesulfonate
9. 3,3'-dimethyl-9-phenylselenacarbocyanine bromide
10. 9-(1-ethyl-2,5-dimethyl-3-pyrryl)-3,3' - dimethylthiacarbocyanine iodide
11. 3,3'-dimethyl-9-piperidylthiacarbocyanine iodide
12. 3,3' - diethyl-9-(1,3-dimethyl-2-indolyl)thiacarbocyanine iodide
13. 9-(3-indolyl)3,3' - dimethyloxathiacarbocyanine iodide
14. 3,3'-diethyl - 9 - (2-methyl-3-indolyl)oxacarbzocyanine perchlorate
15. 3,3'-dimethyl - 9 - (2-phenyl-1-pyrrocolyl)-4,5-benzothiacarbocyanine iodide
16. 3,3'-dimethyl - 9 - N - methylanilinothiacarbocyanine iodide
17. 9-anilino-3,3' - dimethylthiacarbocyanine p - toluenesulfonate
18. 9-acetanilido - 3,3' - dimethylthiacarbocyanine p - toluenesulfonate
19. 9-diphenylamino - 3,3' - diethyl - 4,5,4',5'-dibenzothiacarbocyanine iodide According to my invention, I incorporate one or more of the carbocyanine dyes represented by Formulas I-III above with one or more alkali metal melonates. My invention is particularly directed to the ordinarily employed gelatino-silver-halide emulsions. However, my supersensitizing combinations can be employed in silver halide emulsions in which the carrier or vehicle is other than gelatin, e. g., a resinous substance or cellulosic material which has no deleterious effect on the light-sensitive material. The carbocyanine dyes and alkali metal melonates can be employed in various concentrations depending upon the effects desired.

Ordinarily, the optimum or near optimum concentration of the carbocyanine dyes which I employ in practicing my invention is of the order of 0.01 to 0.30 g. per mol. of silver halide in the emulsion.

The alkali metal melonates which I employ in my invention can advantageously be used at a concentration of from about 0.03 to 5.0 g. per mol. of silver halide in the emulsion.

In general, the ratio of concentration of carbocyanine dye to alkali metal melonate can vary rather widely in my combinations, e. g., from 1:1 to 1:300 (by weight) in many cases.

The methods of incorporating sensitizing dyes in silver halide emulsions are well known to those skilled in the art. The alkali metal melonates can be directly dispersed in the emulsions, or they can be dissolved in water, aqueous alcohol, etc., and added in the form of their solutions. While the carbocyanine dyes can be directly dispersed in the emulsions, it is convenient to add the same in the form of solutions in appropriate solvents, such as methanol, ethanol, pyridine, etc., or mixtures of such solvents, such as pyridine diluted with methanol or acetone. The carbocyanine dyes and alkali metal melonates can be dispersed in the finished emulsions and should be uniformly distributed throughout the emulsions. The following procedure is satisfactory: Stock solutions of the carbocyanine dyes and alkali metal melonates are prepared by dissolving the same in appropriate solvents as described above. Then, to the flowable gelatino-silver-halide emulsion, the desired amounts of stock solution of one of the dyes (or alkali metal melonates) are slowly added, while stirring the emulsion. Stirring is continued until the dye is thoroughly incorporated in the emulsion. Then, the desired amount of the stock solution of the alkali metal melonate (or carbocyanine dye, if alkali metal melonate has been added first) is slowly added to the emulsion while stirring. Stirring is continued until the second solution is thoroughly incorporated. The supersensitized emulsion can then be coated out onto a suitable support, such as glass, cellulose derivative film, resin film, or paper, to a suitable thickness and allowed to dry. The details of such coating techniques are well known to those skilled in the art. The foregoing procedures and proportions are to be regarded only as illustrative. Clearly, my invention is directed to any silver halide emulsion containing a combination of the aforesaid carbocyanine dyes and alkali metal melonates whereby a supersensitizing effect is obtained.

The following examples will serve to illustrate further the manner of practicing my invention.

In the following table, to different portions of the same batch of photographic gelatino-silver-bromiodide emulsion were added (1) a carbocyanine dye (identified by number corresponding to the numbers given above), and (2) a combination of the carbocyanine dye and potassium melonate (1.0 g./mol. AgX). The emulsions were held for a short time at about 50–52° C., coated on a transparent support, chill set, and dried. The coatings were then exposed through a filter as identified in the table on an Eastman type Ib sensitometer. The filter was selected to correspond to the maximum sensitizing effect of the particular dye illustrated. The film strips were then processed for 3 minutes in a developer having the following composition:

| | Grams |
|---|---|
| N-methyl-p-aminophenol sulfate | 2.0 |
| Hydroquinone | 8.0 |
| Sodium sulfite (desiccated) | 90.0 |
| Sodium carbonate (monohydrate) | 52.5 |
| Potassium bromide | 5.0 |
| Water to make one liter. | |

The speed, gamma and fog for each of the coatings were measured. Wratten Filter No. 25 transmits substantially no light of wavelength shorter than about 580 mu, Wratten Filter No. 12 transmits substantially no light of wavelengths shorter than about 495 mu (except about 1 percent between 300 and 400 mu), and Wratten Filter No. 58 transmits only light of wavelength lying between 465 and 620 mu. The results are recorded in the following table:

| Example | Dye (g./mol. AgX) | No Supersensitizer | | | Supersensitized | | | Filter |
|---|---|---|---|---|---|---|---|---|
| | | 30/E Speed | Gamma | Fog | 30/E Speed | Gamma | Fog | |
| 1 | 1 (.08) | 22.0 | 3.1 | .08 | 60.0 | 3.2 | .07 | 25 |
| 2 | 2 (.08) | 13.7 | 2.8 | .08 | 35.0 | 3.0 | .06 | 25 |
| 3 | 3 (.08) | 41.5 | 2.9 | .08 | 53.5 | 3.6 | .06 | 12 |
| 4 | 4 (.08) | 23.5 | 3.3 | .06 | 31.5 | 3.2 | .05 | 58 |
| 5 | 5 (.08) | nil | ---- | .05 | 6.7 | 2.0 | .04 | 25 |
| 6 | 6 (.08) | 6.4 | 2.2 | .08 | 16.9 | 3.3 | .06 | 25 |
| 7 | 7 (.08) | 13.7 | 3.0 | .07 | 36.0 | 3.3 | .06 | 25 |
| 8 | 8 (.08) | 36.0 | 2.8 | .06 | 64.0 | 3.5 | .05 | 25 |
| 9 | 9 (.08) | 12.2 | 3.5 | .07 | 51.0 | 3.5 | .05 | 25 |
| 10 | 10 (.08) | 8.1 | 2.0 | .06 | 16.9 | 3.3 | .06 | 25 |
| 11 | 11 (.08) | 72.0 | 2.1 | .07 | 109 | 3.3 | .08 | 25 |
| 12 | 12 (.08) | 9.0 | 2.6 | .06 | 12.8 | 3.7 | .06 | 58 |
| 13 | 13 (.08) | 14.0 | 3.0 | .06 | 20.5 | 3.5 | .05 | 58 |
| 14 | 14 (.08) | 6.6 | 2.1 | .06 | 13.1 | 3.4 | .05 | 58 |
| 15 | 15 (.08) | 3.1 | 0.9 | .07 | 7.1 | 2.8 | .06 | 25 |
| 16 | 16 (.08) | 13.7 | 3.1 | .05 | 29.5 | 3.3 | .04 | 25 |
| 17 | 17 (.08) | 31.5 | 2.8 | .05 | 43.5 | 3.6 | .04 | 25 |
| 18 | 18 (.08) | 9.5 | 2.6 | .05 | 20.0 | 3.4 | .05 | 25 |
| 19 | 19 (.08) | 26.0 | 3.1 | .06 | 38.0 | 3.1 | .05 | 25 |

My invention is primarily directed to the ordinarily employed gelatino-silver-halide developing-out emulsions, e. g., gelatino-silver-chloride, -chlorobromide, -chloroiodide, -chlorobromiodide, -bromide and -bromiodide developing-out emulsions. Emulsions which form the latent image mostly inside the silver halide grains, such as the emulsions set forth in U. S. Patent 2,456,956, dated December 21, 1948, can also be employed in practicing my invention.

The emulsions prepared in accordance with my invention can be coated in the usual manner on any suitable support, e. g., glass, cellulose nitrate film, cellulose acetate film, polyvinylacetal resin film, paper or metal.

Photographic silver halide emulsions, such as those listed above, containing the supersensitizing combinations of my invention can also contain such addenda as chemical sensitizers, e. g., sulfur sensitizers (e. g., allyl thiocarbamide, thiourea, allylisothiocyanate, cystine, etc.), various gold compounds (e. g., potassium chloroaurate, auric trichloride, etc.) (see U. S. Patents 2,540,085; 2,597,856 and 2,597,915), various palladium compounds, such as palladium chloride (U. S. 2,540,086), potassium chloropalladate (U. S. 2,598,079), etc., or mixtures of such sensitizers; anti-foggants, such as ammonium chloroplatinate (U. S. 2,566,245), ammonium chloroplatinite (U. S. 2,566,263), benzotriazole, nitrobenzimidazole, 5-nitroindazole, benzidine, mercaptans, etc. (see Mees—"The Theory of the Photographic Process," MacMillan Pub., page 460), or mixtures thereof; hardeners, such as formaldehyde (U. S. 1,763,533), chrome alum (U. S. 1,763,533), glyoxal (U. S. 1,870,354), dibromacrolein (Br. 406,750), etc.; color couplers, such as those described in U. S. Patent 2,423,730, Spence and Carroll U. S. Patent 2,640,776, etc.; or mixtures of such addenda. Dispersing agents for color couplers, such as those set forth in U. S. Patents 2,322,027 and 2,304,940, can also be employed in the above-described emulsions.

The accompanying drawing illustrates the supersensitizing effect obtained with three of my new combinations of dyes in gelatino-silver-bromiodide emulsions. Each figure in the drawing is a diagrammatic reproduction of two spectrograms. In each figure, the sensitivity of the emulsion containing only the carbocyanine dye of Formula I, II or III is represented by the solid curve. The sensitivity of the same emulsion containing both a carbocyanine dye as identified above and an alkali metal melonate is represented by the curve consisting of dotted lines. No curve showing the alkali metal melonate alone is shown, since these compounds did not have any significant effect in the silver bromiodide emulsion employed.

In Figure 1, curve A represents the sensitivity of an ordinary gelatino-silver-bromiodide emulsion sensitized with 3,3'-dimethyl-9-phenyl-4,5,4',5'-dibenzothiacarbocyanine iodide and curve b represents the sensitivity of the same emulsion sensitized with 3,3'-dimethyl-9-phenyl-4,5,4',5'-dibenzothiacarbocyanine iodide and potassium melonate. The sensitometric measurements for these emulsions are given in Example 1 of the above table.

In Figure 2, curve C represents the sensitivity of an ordinary gelatino-silver-bromiodide emulsion sensitized with 3,3'-dimethyl-9-phenylselenacarbocyanine bromide and curve D represents the sensitivity of the same emulsion sensitized with 3,3'-dimethyl-9-phenylselenacarbocyanine bromide and potassium melonate. The sensitomeric measurements for these emulsions are given in Example 9 of the above table.

In Figure 3, curve E represents the sensitivity of an ordinary gelatino-silver-bromiodide emulsion sensitized with 3,3'-dimethyl-9-phenylthiacarbocyanine iodide and curve F represents the sensitivity of the same emulsion sensitized with 3,3'-dimethyl-9-phenylthiacarbocyanine iodide and potassium melonate. The sensitometric measurements for these emulsions are given in Example 2 of the above table.

Other water-soluble salts of melonic acid (i. e., hydromelonic acid), such as ammonium salts, organic amine salts (e. g., triethanolamine, triethylamine, pyridine, etc.) can also be employed in the supersensitizing combinations of my invention, although generally less advantageously than the alkali metal salts illustrated above.

It has been found also that certain cyanine dyes, other than those illustrated above, can be usefully employed in combination with alkali metal melonates to alter the sensitivity of photographic silver halide emulsions. However, such dyes do not generally provide results comparable to those shown in the above examples. Certain of the di-substituted dyes of Brooker et al. U. S. Patent 2,478,366, issued August 9, 1949, such as 3,3'diethyl-8,10-ethylenethiacarbocyanine iodide, can be employed in supersensitizing combinations with alkali metal melonates. Certain of the trinuclear dyes contemplated by Kendall et al. U. S. Patent 2,385,815, issued October 2, 1945, such as 3,3'-dimethyl-9-[1-methyl-2-phenyl-4-(3-pyrazolonyl)] thiacarbocyanine bromide, can also be employed in combinations with alkali metal melonates. A number of the holopolar dyes contemplated by Brooker et al. U. S. Patent 2,739,964 issued March 27, 1956, such as 3-[di(3 - methyl - 2(3H) - benzothiazolylidene) isopropylidene]-2(3H)-imidazol[1,2-a]pyridone, can also be employed in combination with the alkali metal melonates illustrated above. As a class, the particular chain-substituted carbocyanine dyes of the instant invention are much more useful than the class of dyes illustrated in the above patents. Many chain-substituted carbocyanine dyes other than those described above fail to show any useful effect in combination with alkali metal melonates.

What I claim as my invention and desire secured by Letters Patent of the United States is:

1. A photographic silver halide emulsion sensitized with a supersensitizing combination of (1) at least one carbocyanine dye selected from those represented by the following general formula:

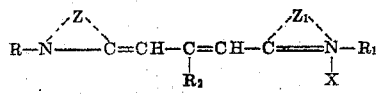

wherein R and $R_1$ each represents an alkyl group containing from 1 to 4 carbon atoms, $R_2$ represents a member selected from the group consisting of an aryl group, a pyrryl group, a thienyl group, and an amino group, X represents an acid radical, and Z and $Z_1$ each represents the non-metallic atoms necessary to complete a heterocyclic nucleus selected from the group consisting of those of the benzothiazole series, those of the naphthothiazole series, those of the benzoxazole series, those of the naphthoxazole series, those of the benzoselenazole series, those of the naphthoselenazole series, and those of the 2-quinoline series and (2) an alkali metal salt of melonic acid.

2. A photographic silver halide emulsion sensitized with a supersensitizing combination of (1) at least one carbocyanine dye selected from those represented by the following general formula:

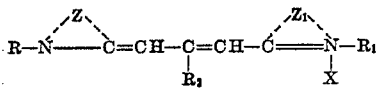

wherein R and $R_1$ each represents an alkyl group containing from 1 to 4 carbon atoms, $R_2$ represents a monocyclic aryl group of the benzene series, X represents an acid radical, and Z and $Z_1$ each represents the non-metallic atoms necessary to complete a heterocyclic nucleus selected from the group consisting of those of the benzothiazole series, those of the naphthothiazole series, those of the benzoxazole series, those of the naphthoxazole series, those of the benzoselenazole series, those of the naphthoselenazole series and those of the 2-quinoline series, and (2) an alkali metal melonate.

3. A photographic silver halide emulsion sensitized with a supersensitizing combination of (1) at least one carbocyanine dye selected from those represented by the following general formula:

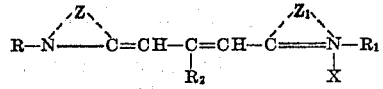

wherein R and $R_1$ each represents an alkyl group containing from 1 to 4 carbon atoms, $R_2$ represents a thienyl group, X represents an acid radical, and Z and $Z_1$ each represents the non-metallic atoms necessary to complete a heterocyclic nucleus selected from the group consisting of those of the benzothiazole series, those of the naphthothiazole series, those of the benzoxazole series, those of the naphthoxazole series, those of the benzoselenazole series, those of the naphthoselenazole series and those of the 2-quinoline series, and (2) an alkali metal melonate.

4. A photographic silver halide emulsion sensitized with a supersensitizing combination of (1) at least one carbocyanine dye selected from those represented by the following general formula:

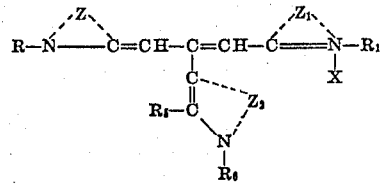

wherein R and $R_1$ each represents an alkyl group containing from 1 to 4 carbon atoms, $R_5$ and $R_6$ each represents a member selected from the group consisting of a hydrogen atom, an alkyl group containing from 1 to 12 carbon atoms, a monocyclic aryl group of the benzene series, and groups which together represent the non-metallic atoms necessary to complete a heterocyclic nucleus of the pyridine series, X represents an acid radical, Z and $Z_1$ each represents the non-metallic atoms necessary to complete a heterocyclic nucleus selected from the group consisting of those of the benzothiazole series, those of the naphthothiazole series, those of the benzoxazole series, those of the naphthoxazole series, those of the benzoselenazole series, those of the naphtho-selenazole series and those of the 2-quinoline series, and $Z_2$ represents the non-metallic atoms necessary to complete a heterocyclic nucleus selected from the group consisting of a pyrrole group, an indole group, a pyrrocoline group and a benzoindole group, and (2) an alkali metal melonate.

5. A photographic silver halide emulsion sensitized with a supersensitizing combination of (1) at least one carbocyanine dye selected from those represented by the following general formula:

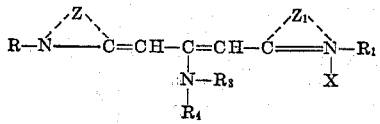

wherein R and $R_1$ each represents an alkyl group containing from 1 to 4 carbon atoms, $R_3$ represents a member selected from the group consisting of a hydrogen atom, an alkyl group, a monocyclic aryl group of the benzene series, and a carboxylic acyl group, $R_4$ represents a member selected from the group consisting of a lower alkyl group, a monocyclic aryl group of the benzene series, and groups which together with $R_3$ represents the non-metallic atoms necessary to complete a heterocyclic nucleus selected from the group consisting of piperidine and morpholine, X represents an acid radical, and Z and $Z_1$ each represents the non-metallic atoms necessary to complete a heterocyclic nucleus selected from the group consisting of those of the benzothiazole series, those of the naphthothiazole series, those of the benzoxazole series, those of the naphthoxazole series, those of the benzoselenazole series, those of the naphthoselenazole series and those of the 2-quinoline series, and (2) an alkali metal melonate.

6. A photographic gelatino-silver-halide emulsion sensitized with a supersensitizing combination of (1) at least one carbocyanine dye selected from those represented by the following general formula:

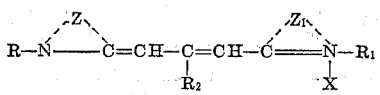

wherein R and $R_1$ each represents an alkyl group containing from 1 to 4 carbon atoms, $R_2$ represents a monocyclic aryl group of the benzene series, X represents an acid radical, and Z and $Z_1$ each represents the non-metallic atoms necessary to complete a heterocyclic nucleus selected from the group consisting of those of the benzothiazole series, those of the naphthothiazole series, those of the benzoxazole series, those of the naphthoxazole series, those of the benzoselenazole series, those of the naphthoselenazole series and those of the 2-quinoline series, and (2) potassium melonate.

7. A photographic gelatino-silver-halide emulsion sensitized with a supersensitizing combination of (1) at least one carbocyanine dye selected from those represented by the following general formula:

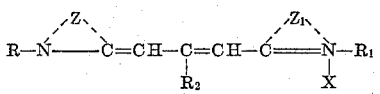

wherein R and $R_1$ each represents an alkyl group containing from 1 to 4 carbon atoms, $R_2$ represents a thienyl group, X represents an acid radical, and Z and $Z_1$ each represents the non-metallic atoms necessary to complete a heterocyclic nucleus selected from the group consisting of those of the benzothiazole series, those of the naphthothiazole series, those of the benzoxazole series, those of the naphthoxazole series, those of the benzoselenazole series, those of the naphthoselenazole series and those of the 2-quinoline series, and (2) potassium melonate.

8. A photographic gelatino-silver-halide emulsion sensitized with a supersensitizing combination of (1) at least one carbocyanine dye selected from those represented by the following general formula:

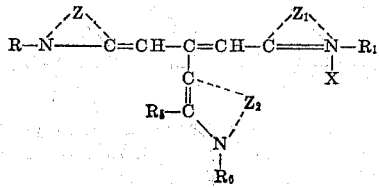

wherein R and $R_1$ each represents an alkyl group containing from 1 to 4 carbon atoms, $R_5$ and $R_6$ each represents a member selected from the group consisting of a hydrogen atom, an alkyl group containing from 1 to 12 carbon atoms, a monocyclic aryl group of the benzene series, and groups which together represent the non-metallic atoms necessary to complete a heterocyclic nucleus of the pyridine series, X represents an acid radical, Z and $Z_1$ each represents the non-metallic atoms necessary to complete a heterocyclic nucleus selected from the group consisting of those of the benzothiazole series, those of the naphthothiazole series, those of the benzoxazole series, those of the naphthoxazole series, those of the benzoselenazole series, those of the naphthoselenazole series and those of the 2-quinoline series, and $Z_2$ represents the non-metallic atoms necessary to complete a heterocyclic nucleus selected from the group consisting of a pyrrole group, an indole group, a pyrrocoline group and a benzoindole group, and (2) an alkali metal melonate.

9. A photographic gelatino-silver-halide emulsion sensitized with a supersensitizing combination of (1) at least one carbocyanine dye selected from those represented by the following general formula:

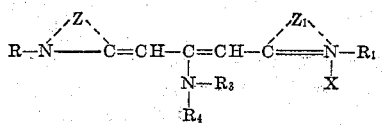

wherein R and $R_1$ each represents an alkyl group containing from 1 to 4 carbon atoms, $R_3$ represents a member selected from the group consisting of a hydrogen atom, an alkyl group, a monocyclic aryl group of the benzene series, and a carboxylic acyl group, $R_4$ represents a member selected from the group consisting of a lower alkyl group, a monocyclic aryl group of the benzene series, and groups which together with $R_3$ represents the non-metallic atoms necessary to complete a heterocyclic nucleus selected from the group consisting of piperidine and morpholine, X represents an acid radical, and Z and $Z_1$ each represents the non-metallic atoms necessary to complete a heterocyclic nucleus selected from the group consisting of those of the benzothiazole series, those of the naphthothiazole series, those of the benzoxazole series, those of the naphthoxazole series, those of the benzoselenazole series, those of the naphthoselenazole series and those of the 2-quinoline series, and (2) potassium melonate.

10. A photographic gelatino-silver-halide emulsion sensitized with a supersensitizing combination of (1) at least one carbocyanine dye selected from those represented by the following general formula:

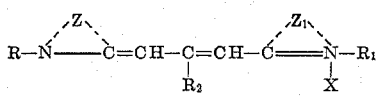

wherein R and $R_1$ each represents an alkyl group containing from 1 to 4 carbon atoms, $R_2$ represents a monocyclic aryl group of the benzene series, X represents an acid radical, and Z and $Z_1$ each represents the non-metallic atoms necessary to complete a heterocyclic nucleus of the naphthothiazole series, and (2) potassium melonate.

11. A photographic gelatino-silver-halide emulsion sensitized with a supersensitizing combination of (1) at least one carbocyanine dye selected from those represented by the following general formula:

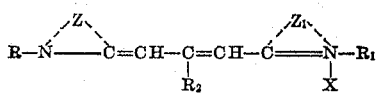

wherein R and $R_1$ each represents an alkyl group containing from 1 to 4 carbon atoms, $R_2$ represents a monocyclic aryl group of the benzene series, X represents an acid radical, and Z and $Z_1$ each represents the non-metallic atoms necessary to complete a heterocyclic nucleus of the benzoselenazole series, and (2) potassium melonate.

12. A photographic gelatino-silver-halide emulsion sensitized with a supersensitizing combination of (1) at least one carbocyanine dye selected from those represented by the following general formula:

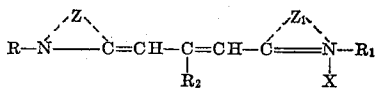

wherein R and $R_1$ each represents an alkyl group containing from 1 to 4 carbon atoms, $R_2$ represents a thienyl group, X represents an acid radical, and Z and $Z_1$ each represents the non-metallic atoms necessary to complete a heterocyclic nucleus of the naphthothiazole series, and (2) potassium melonate.

13. A photographic gelatino-silver-halide emulsion sensitized with a supersensitizing combination of (1) at least one carbocyanine dye selected from those represented by the following general formula:

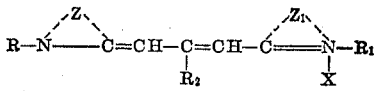

wherein R and $R_1$ each represents an alkyl group containing from 1 to 4 carbon atoms, $R_2$ represents a 3-pyrryl group, X represents an acid radical, Z represents the non-metallic atoms necessary to complete a heterocyclic nucleus of the naphthoselenazole series, and $Z_1$ represents the non-metallic atoms necessary to complete a heterocyclic nucleus of the naphthothiazole series, and (2) potassium melonate.

14. A photographic gelatino-silver-halide emulsion sensitized with a supersensitizing combination of (1) at least one carbocyanine dye selected from those represented by the following general formula:

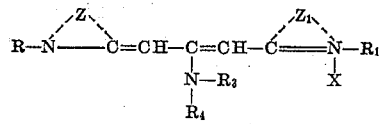

wherein R and $R_1$ each represents an alkyl group containing from 1 to 4 carbon atoms, $R_3$ represents a lower alkyl group, $R_4$ represents a monocyclic aryl group of the benzene series, X represents an acid radical, and Z and $Z_1$ each represents the non-metallic atoms necessary to complete a heterocyclic nucleus of the benzothiazole series, and (2) potassium melonate.

15. A photographic gelatino-silver-halide emulsion sensitized with a supersensitizing combination of 3,3'-dimethyl - 9-phenyl-4,5,4',5'-dibenzothiacarbocyanine iodide and potassium melonate.

16. A photographic gelatino-silver-halide emulsion sensitized with a supersensitizing combination of 3,3'-dimethyl - 9 - phenylselenacarbocyanine bromide and potassium melonate.

17. A photographic gelatino-silver-halide emulsion sensitized with a supersensitizing combination of 3,3'-dimethyl-9-(2-thienyl)-4,5,4',5'-dibenzothiacarbocyanine p-toluenesulfonate and potassium melonate.

18. A photographic gelatino-silver-halide emulsion sensitized with 3,3'-dimethyl-9-(3-pyrryl)-4,5,4',5'-dibenzoselenathiacarbocyanine p-toluenesulfonate and potassium melonate.

19. A photographic gelatino-silver-halide emulsion sensitized with 3,3' - dimethyl - 9 - N-methylanilinothiacarbocyanine iodide and potassium melonate.

References Cited in the file of this patent
UNITED STATES PATENTS
2,704,716   Beach et al. _____ Mar. 22, 1955